United States Patent [19]
Sih et al.

[11] Patent Number: 5,920,834
[45] Date of Patent: Jul. 6, 1999

[54] ECHO CANCELLER WITH TALK STATE DETERMINATION TO CONTROL SPEECH PROCESSOR FUNCTIONAL ELEMENTS IN A DIGITAL TELEPHONE SYSTEM

[75] Inventors: Gilbert C. Sih; Anthony P. Mauro, both of San Diego, Calif.

[73] Assignee: Qualcomm Incorporated, San Diego, Calif.

[21] Appl. No.: 08/834,397

[22] Filed: Jan. 31, 1997

[51] Int. Cl.[6] ............................... H04B 3/23; G10L 3/02
[52] U.S. Cl. .................... 704/233; 704/221; 704/226; 379/410
[58] Field of Search ................... 704/221, 226, 704/233; 370/286; 379/410

[56] References Cited

U.S. PATENT DOCUMENTS

| | | | |
|---|---|---|---|
| 5,307,405 | 4/1994 | Sih | 379/410 |
| 5,598,468 | 1/1997 | Ammicht et al. | 379/410 |
| 5,742,734 | 4/1998 | DeJaco et al. | 704/226 |

FOREIGN PATENT DOCUMENTS 9642142  12/1996  WIPO ..................... H04B 7/015

OTHER PUBLICATIONS

David G. Messerschmitt, "Echo Cancellation in Speech and Data Transmission," IEEE Journal on Selected Areas in Communications, vol. SAC–2, No. 2, pp. 283–297, Mar. 1984.

*Primary Examiner*—David R. Hudspeth
*Assistant Examiner*—Tālivaldis Ivars Šmits
*Attorney, Agent, or Firm*—Russell B. Miller; Thomas M. Thibault

[57] ABSTRACT

A method and apparatus for controlling various functional elements in a digital telephone system using state determination from an echo canceller. An echo canceller is used to evaluate which one of five talk states two speakers are engaged in during a telephone conversation. This state determination information is used to control a tone detector function, a noise suppressor function, an adaptive equalizer function, a transmission mute function, and a vocoder encoder function within a vocoder. During the talk state where the far-end speaker is active and the near-end speaker is inactive, the echo canceller provides a signal which disables background noise estimates from being performed in the noise suppressor and the vocoder encoder. The same signal is used to disable the tone detector and to enable the transmission mute function during this talk state.

28 Claims, 7 Drawing Sheets

ECHO CANCELLER WITH TALK STATE DETERMINATION TO CONTROL SPEECH PROCESSOR FUNCTIONAL ELEMENTS IN A DIGITAL TELEPHONE SYSTEM

BACKGROUND OF THE INVENTION

1. Field of the Invention

The present invention relates to digital telephone systems. More particularly, the present invention relates to a novel and improved method and apparatus for using state determination from an echo canceller to control various functional blocks in a digital telephone system.

2. Description of the Related Art

Transmission of voice by digital techniques has become widespread, particularly in cellular telephone and PCS applications. This, in turn, has created an interest in improving speech processing techniques. Three of such techniques include the addition of echo cancellers, noise suppressors, and voice encoders/decoders, or vocoders, to existing elements of digital telephone systems.

Echo cancellers are used to diminish undesired echo signals caused by impedance mismatches in land-based telephone networks, or in the case of mobile telephones, echo caused by acoustic coupling between speaker and microphone in "hands free" telephones. Vocoders are used to remove natural redundancies of speech in a digitized signal in order to reduce data transmission rates and consequently the amount of information being transmitted over a given transmission channel. Noise suppressors are used to minimize background noise. Echo cancellers, vocoders, and noise suppressors are presently used together in digital telephone systems both in land-based applications and in mobile systems.

There are two types of echo cancellers, the network echo canceller and the acoustic echo canceller. An example of a typical network echo canceller is disclosed in U.S. Pat. No. 5,307,405 entitled "NETWORK ECHO CANCELLER", which is assigned to the assignee of the present invention and incorporated by reference herein. A network echo canceller cancels the echo produced in a telephone network. A land-based telephone is connected to a central office by a two wire line to support transmission in both directions. For calls farther than about 35 miles, the two directions of transmission must be segregated onto physically separate wires, resulting in a four-line wire. The device that interfaces the two-wire and four-wire segments is known as a hybrid. An impedance mismatch at the hybrid results in an echo which must be removed by a network echo canceller. Acoustic echo cancellers are used in teleconferencing and hands-free telephony applications. An acoustic echo canceller eliminates acoustic echo resulting from the feedback between a loudspeaker and a microphone.

In a typical digital telephone system, speech is converted from an analog signal to digital PCM samples by an A/D converter. In a typical embodiment, a data rate of 64 kbps is chosen in order to retain good voice quality. Once the speech signal has been digitized, it can be manipulated to achieve certain benefits, such as maximization of system capacity, speech quality enhancement, noise suppression, and minimization of transmission errors.

After the speech signal has been converted to PCM samples, undesired echo can be removed by an echo canceller, background noise can be minimized by a noise suppressor, and data compression can be performed by a vocoder before modulation and upconversion for transmission. An example of a variable rate vocoder is disclosed in U.S. Pat. No. 5,414,796 entitled "VARIABLE RATE VOCODER", which is assigned to the assignee of the present invention and incorporated by reference herein. The encoded speech signal can be modulated by any number of techniques, including TDMA, CDMA, or analog modulation. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," which is assigned to the assignee of the present invention and incorporated by reference herein. Combining the echo canceller with the vocoder and noise suppressor has certain benefits as well as problems associated with it.

One problem with introducing an echo canceller into the front end electronics of a digital telephone system is that it alters the speech signal to the other functional blocks due to its location in the system relative to the other functional blocks. By placing the echo canceller first in the chain of functional blocks, the noise suppressor and vocoder must make background noise calculations based on an echo-canceled signal rather than actual background noise. If the echo canceller does not remove all of the echo from the speech signal, the residual echo can cause errors in the background noise calculations performed by the noise suppressor and vocoder.

Herein, a mobile user is referred to as the near-end speaker and the land-based user is referred to as the far-end speaker. A typical vocoder may contain a noise suppressor whose function is to remove background noise from the near-end speech signal. An example of a typical noise suppressor is disclosed in U.S. Pat. No. 4,811,404 entitled "NOISE SUPPRESSION SYSTEM", which is assigned to Motorola, Inc. and incorporated by reference herein. Noise suppression is performed by calculating an estimate of the actual background noise energy during periods when the near-end speaker is silent. A problem occurs if the near-end speaker is silent and the far-end speaker is talking. In the mobile telephone, the far-end speaker's voice can be acoustically coupled from the speaker to the microphone, resulting in an echo that will be heard by the far-end speaker unless it is removed. In a land-based system, near-end speech can be coupled onto the far-end speaker's voice signal due to the impedance mismatch in the hybrid discussed above. An echo canceller is used to eliminate the echo, but because of limitations of the echo canceller, the echo will not be completely removed. A noise suppressor placed after the echo canceller may interpret the residual echo as background noise and update the background noise estimate based upon the residual echo. This corrupts the background noise estimate, resulting in degraded noise suppression. The vocoder will suffer by providing a poor estimate of the background noise to a synthesized noise generator in the system. In addition, the vocoder's encoding rate decisions will be adversely affected.

It is therefore an object of the present invention to prevent erroneous background noise updates in the noise suppressor and the vocoder encoder when the near-end speaker is silent and the far-end speaker is active.

It is another object of the present invention to use the state determination signal from the echo canceller to control other functional elements within a digital telephone system, such as a tone detector, a transmission mute function, and an adaptive equalizer.

SUMMARY OF THE INVENTION

The present invention is a novel and improved combination of functional elements within a digital telephone system. In accordance with the present invention, an echo canceller is used in combination with a vocoder wherein the echo canceller provides information to various functional blocks within the vocoder for purposes of noise suppression, DTMF tone detection, transmission muting and voice encoding. An immediate benefit of combining the an echo canceller with a vocoder is the cost, weight, and space savings of combining two integrated circuits onto a single integrated circuit.

In the exemplary embodiment of the present invention, an echo canceller is used that determines, among other things, which mode of speech that two persons are engaged in. In the exemplary embodiment, five different modes or talk states are possible: near-end speech only, far-end speech only, both speakers talking, neither speaker talking, and hangover, which is the brief period of time immediately following a pause in the conversation.

The present invention uses the state determination of the echo canceller in several functional blocks within the vocoder. Of particular importance is the use of the state determination signal in the noise suppressor function within the vocoder. In the exemplary embodiment, the noise suppressor operates by dividing the input signal into selected frequency bands, generating a signal-to-noise ratio for each frequency band, then amplifying each frequency band according to a pre-defined gain table. The speech/noise determination is performed as follows. The raw signal-to-noise ratio estimates for each frequency band are used to index a voice metric table to obtain voice metric values for each channel. A voice metric is a measurement of the overall voice-like characteristics of the channel energy. The individual channel voice metric values are summed to create a multi-channel energy parameter, and then compared to a background noise update threshold. If the voice metric sum does not meet the threshold, the input frame is deemed to be noise, and a background noise update is performed. If the voice metric sum exceeds the threshold, then that frame is treated as speech and the background noise estimate is not updated. Problems can occur if the noise suppressor treats residual echo from the echo canceller as background noise. In that case, the noise estimation algorithm will re-calculate the background noise based on the residual echo, which would corrupt the noise estimate.

The present invention eliminates this problem by providing a state information signal from the echo canceller which disables background noise updates in the noise suppressor when the talk mode is determined to be far-end only. Without the state information from the echo canceller, the noise suppressor will erroneously update the background noise calculation based on the residual echo signal from the echo canceller.

In an alternative embodiment, a second signal from the echo canceller is provided to the noise suppressor indicating whether any echo is in fact present at the input to the echo canceller. The second signal will allow background noise estimates to be performed in the noise suppressor if no echo is present at the echo canceller, even when the state information signal would otherwise disable the update.

Furthermore, in the present invention, the state determination from the echo canceller is used to control the tone detector function within the vocoder. The tone detector checks the transmission signal for DTMF tones. If tones are detected, the normal transmission signal is muted and a signaling message is sent over-the-air that causes the tones to be generated at the receiver. This is done because a sufficiently high erasure rate can degrade a vocoded tone enough that it will not be detected. The tone detector can be disabled by the state determination signal from the echo canceller during the far-end only talk state, resulting in power savings.

In addition, the present invention uses state determination from the echo canceller to control the transmission mute function within the vocoder. The transmission mute replaces PCM samples with synthesized noise that matches the spectral characteristics of the actual background noise. The spectral information and volume control for the synthesized noise is provided by analysis performed by the vocoder encoder. The transmission mute function is enabled when the echo canceller's state determination indicates far-end speech only. This way, all echo is eliminated from the transmission signal.

The present invention also uses state determination from the echo canceller to control an adaptive equalizer. This equalizer modifies the frequency response of the received near-end signal to compensate for frequency response degradations in the transmission path. The equalizer estimates the frequency characteristics of the transmission path during near-end speech and uses this estimation to construct a filter that shapes the overall frequency response to a desired characteristic. Since this estimate of the received frequency response would be corrupted by the presence of an echo signal, the echo canceller only allows the equalizer to update its estimate of the frequency response during the near-end only speech state.

Finally, the present invention uses state determination from the echo canceller to control the background noise estimate function that is performed by the vocoder encoder. This background noise estimate is performed in order to generate synthesized noise information to be used by the transmission mute block, discussed above, and to generate threshold information used to decide which data rate to encode with. The goal is to match the synthesized noise with the actual noise-suppressed background noise so that the far-end listener is oblivious to periods of synthesized noise replacement. The background noise calculation is enhanced by providing state information from the echo canceller to the background noise estimate function. The echo canceller disables the background noise estimate during periods of synthesized noise replacement so that a background noise update is not performed on synthesized noise.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
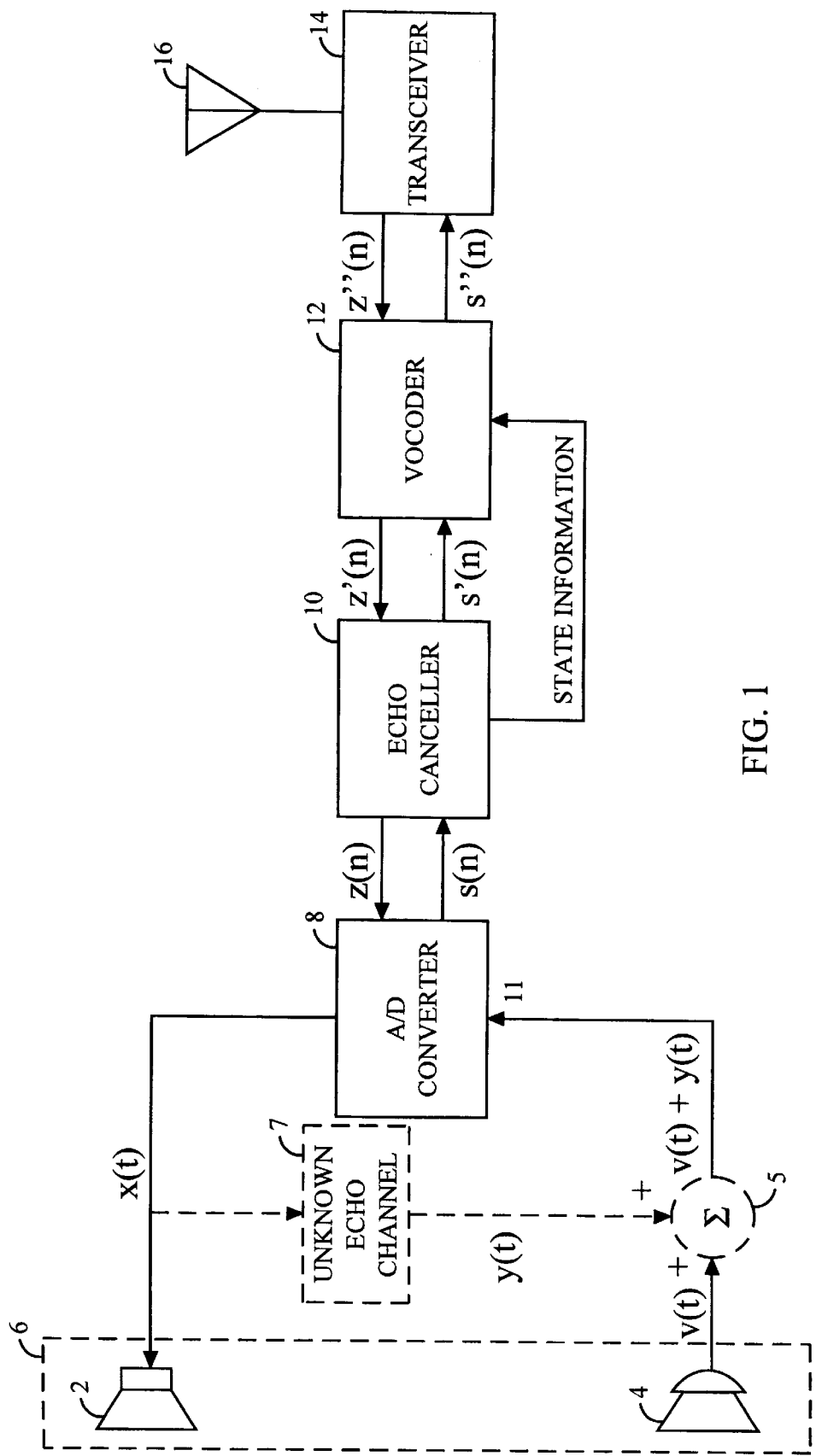
FIG. 1 is a functional block diagram of a mobile digital telephone.

FIG. 1 is an overall block diagram of a digital cellular or PCS telephone. For simplicity of explanation, only a subset of elements are shown. The digital cellular telephone consists of handset 6, which includes microphone 4 and speaker 2; Analog-to-Digital (A/D) converter 8; echo canceller 10; vocoder 12; transceiver 14; and antenna 16. It should be understood that other architectures may be employed for the system with a mere change in location or position of the various operational elements.

During transmission, near-end speech is received by microphone 4 provided in handset 6. The near-end speech signal is transformed by microphone 4 into an electro-acoustic signal represented by the term v(t) as shown in FIG. 1. Received far-end speech signal x(t) is acoustically coupled to speech signal v(t) at summer 5, modeled as passing x(t) through unknown echo channel 7 to produce echo signal y(t). The output of summer 5 is shown as combined speech/echo signal v(t)+y(t). Unknown echo channel 7 and summer 5 are not included elements in the system itself, but rather are parasitic results from the physical proximity of microphone 4 and speaker 2.

The speech/echo signal v(t)+y(t) is then converted from an analog signal to PCM samples by Analog-to-Digital converter 8. In an exemplary embodiment, PCM samples are output by A/D converter 8 at a rate of 64 kbits per second and are represented by signal s(n) as shown in FIG. 1.

Echo canceller 10 removes echo signal y(t) from digitized speech/echo signal s(n). In the exemplary embodiment, echo canceller 10 operates in accordance with the echo canceller described in aforementioned U.S. Pat. No. 5,307,405. In the exemplary embodiment, echo canceller 10 performs echo cancellation by determining which of several different talk states the speakers are engaged in, the states being near-end speech only, far-end speech only, both near and far-end speech simultaneously, neither speaker talking, or hangover. Once the talk state is determined by echo canceller 10, an estimate of echo signal y(n) is removed from digitized speech/echo signal s(n). Because the echo signal cannot be completely eliminated, a residual echo signal will remain as part of the digitized speech signal. This echo canceled speech signal, s'(n), is then processed by vocoder 12. In the exemplary embodiment, vocoder 12 is a variable rate code excited linear prediction (CELP) vocoder as described in aforementioned U.S. Pat. No. 5,414,796. In the exemplary embodiment, vocoder 12 operates in conjunction with a noise suppression system as described in detail in aforementioned U.S. Pat. No. 4,811,404.

Figure 2:
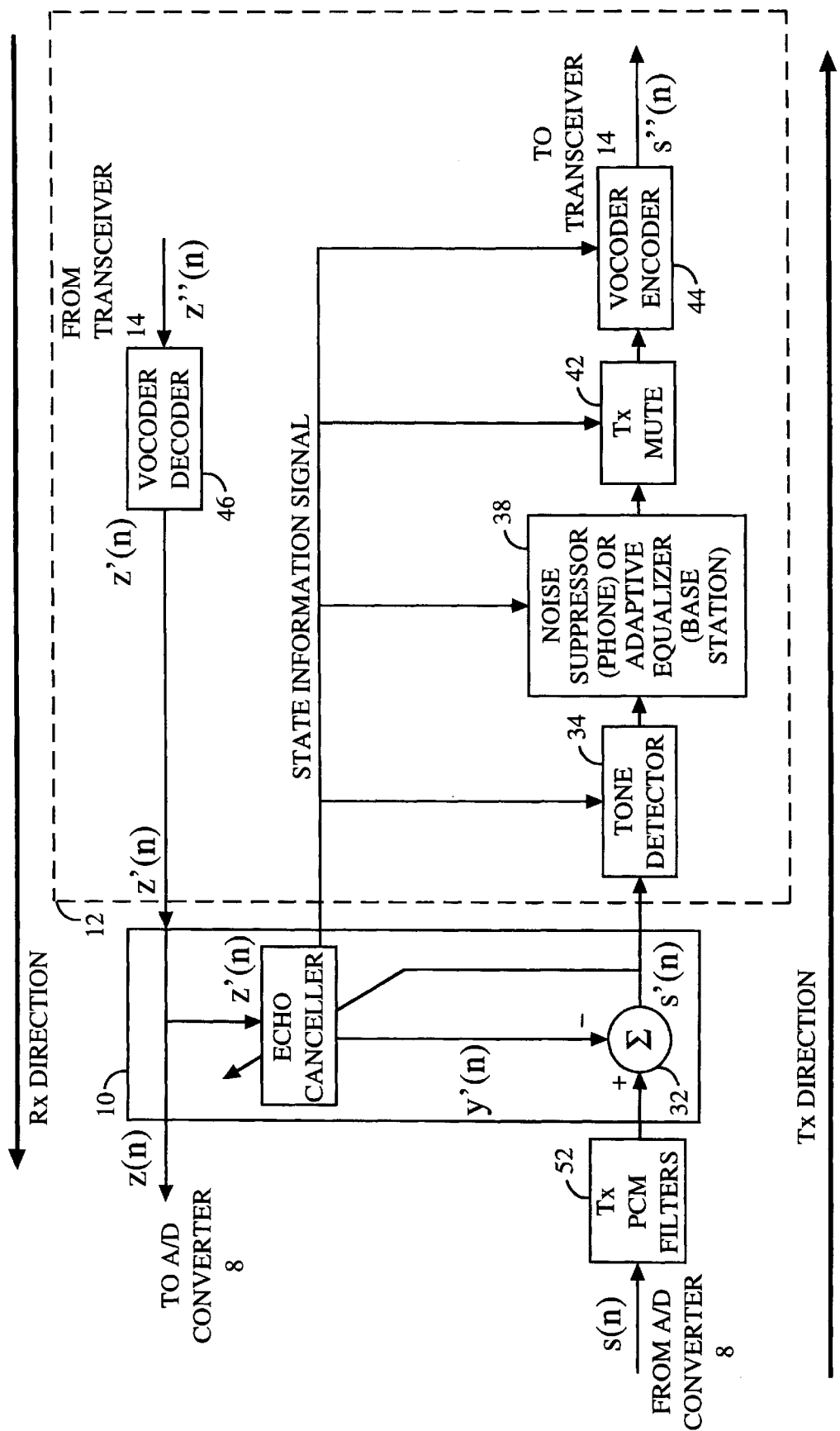
FIG. 2 is a functional block diagram of an echo canceller and a vocoder.

Vocoder 12 performs several functions on signal s'(n) including, but not limited to, speech compression, noise suppression, transmit and receive volume control, DTMF tone detection, and transmission muting. In the present invention, vocoder 12 uses the state determining results from echo canceller 10, shown as "state information" in FIG. 1, in its algorithm to decide when to update its background noise estimate. Further details of echo canceller 10 and vocoder 12 are shown in FIG. 2 and are discussed more fully later herein.

The vocoded speech signal, s"(n), is then provided to transceiver 14 where it is modulated in accordance with a predetermined modulation format such as Code Division Multiple Access (CDMA), Time Division Multiple Access (TDMA), Frequency Division Multiple Access (FDMA), or analog modulation. In the exemplary embodiment, transceiver 14 modulates the signal in accordance with a CDMA modulation format as described in the aforementioned U.S. Pat. No. 4,901,307. Transceiver 14 then upconverts and amplifies the modulated signal. The modulated signal is then transmitted through antenna 16 to base station transceivers (not shown).

A similar reciprocal process occurs for received speech. A CDMA modulated signal is received at antenna 16 and provided to transceiver 14. Transceiver 14 amplifies, downconverts, and demodulates the received signal. In the exemplary embodiment, transceiver 14 demodulates the received signal in accordance with a CDMA demodulation format as described in the aforementioned U.S. Pat. Nos. 5,103,459 and 4,901,307. The demodulated signal, z"(n), is provided to vocoder 12.

In the exemplary embodiment, vocoder 12 receives encoded variable-length data packets every 20 ms at data rates ranging from 1200–9600 bps. Vocoder 12 decodes the packets into 64 kbps PCM samples according to the aforementioned U.S. Pat. No. 5,414,796. Then the decoded signal, z'(n), is provided to echo canceller 10 where it is used as a reference to remove undesired echo signal y(t) from the desired speech signal. The decoded signal output from echo canceller 10 is shown as z(n) in FIG. 1.

Finally decoded signal z(n) is converted to an analog waveform by A/D converter 8, then converted to acoustic far-end speech using speaker 2 provided in handset 6.

FIG. 2 is a functional block diagram of echo canceller 10 and vocoder 12. In an exemplary embodiment, echo canceller 10 and vocoder 12 are configured in digital processor form, such as model ADSP-2181 of the ADSP-2100 series of digital signal processors manufactured by Analog Devices of Norwood, Mass. It should be understood that other digital signal processors may be programmed to function in accordance with the teachings herein. Alternatively, other implementations of echo canceller 10 and vocoder 12 may be configured from discrete processors or in application specific integrated circuit (ASIC) form. It should also be understood that vocoder 12 can be configured using any combination of functional blocks shown in FIG. 2.

During transmission, digitized speech/echo signal s(n) is received by Tx PCM Filters 52 from A/D converter 8. Low frequency components are filtered out because echo canceller 10 cannot synthesize a DC component. The filtered signal is provided to summer 32 within echo canceller 10 where estimated echo signal y'(n) is subtracted from it. The estimated echo estimate signal, y'(n), is produced by processing received digital speech signal z'(n) using an adaptive filtering operation performed within echo canceller 10. An example of echo canceller 10 is disclosed aforementioned U.S. Pat. No. 5,307,405. The details of echo canceller 10 will be described in greater detail later herein.

The output produced by echo canceller 10 contains the desired digitized speech signal plus a residual signal left over from the echo canceling process. The residual signal will be present because the echo canceller can never completely remove all of the echo from the digitized speech signal.

The output signal is then provided to tone detector 34, where it is checked to see if the signal contains DTMF tones. If the signal contains DTMF tones, Tx Mute 42 is activated by tone detector 34 and transceiver 14 is instructed to send DTMF tone signals. To save computation, tone detector 34 is bypassed if echo canceller 10 determines that the talk state is far-end only or both speakers silent.

In the phone, the output signal from echo canceller 10 is then processed by noise suppressor 38 which attenuates heavy background noise. Alternatively, in the base station, an adaptive equalizer is used in place of noise suppressor 38 to dynamically control the frequency content of the digitized speech signal from the near-end user. An example of an adaptive equalizer is disclosed in co-pending U.S. patent application Ser. No. 08/953,102, which is a file wrapper continuation of Ser. No. 08/456,277 filed Apr. 28, 1995, entitled "METHOD AND APPARATUS FOR PERFORMING ADAPTIVE EQUALIZATION", assigned to the assignee of the present invention and incorporated by reference herein. An example of noise suppressor 38 is disclosed in aforementioned U.S. Pat. No. 4,811,404. It should be understood that other implementations of noise suppressor 38 may be used other than the one disclosed in U.S. Pat. No. 4,811,404.

Noise suppressor 38 updates its estimate of the background noise characteristics by measuring the spectral characteristics of the incoming signal. The present invention provides a state determination signal from echo canceller 10 to aid in the background noise estimate update decision. Allowing the echo canceller to assist in the enabling and disabling of the background noise estimate update provides significant advantages that will become obvious later herein.

The noise-suppressed speech signal from noise suppressor 38 is then provided to Tx mute 42 which, when enabled, replaces the digitized speech signal with synthesized noise which in the exemplary embodiment matches the spectral characteristics of the actual background noise. If Tx Mute 42 is disabled, the speech signal is provided to vocoder encoder 44 unchanged. Tx Mute 42 is enabled by echo canceller 10 during the far-end only talk state.

The speech signal is then passed from Tx mute 42 to vocoder encoder 44. An example of vocoder encoder 44 and vocoder decoder 46 is disclosed in aforementioned U.S. Pat. No. 5,414,796. In the exemplary embodiment, vocoder encoder 44 accepts digitized speech samples at 64 kbps and compresses it to achieve a reduced data rate. This is accomplished by removing all of the natural redundancies inherent in speech. The basis of this technique is to compute the parameters of a filter, called the LPC filter, which performs short-term predictions of the speech waveform using a model of the human vocal tract. In addition, long term effects, related to the pitch of the speech, are modeled by computing the parameters of a pitch filter, which essentially model the human vocal chords. Finally, these filters must be excited, and this is done by determining which one of a number of random excitation waveforms in a codebook results in the closest approximation to the original speech when the waveform excites the two filters mentioned above. A background noise estimation is also performed within vocoder encoder 44 which estimates the energy of the background noise during periods of silence. Since the background noise estimate should only be updated on actual background noise, it is desirable to use the state information signal from echo canceller 10 to determine when both near-end and far-end speakers are silent. Without this information from echo canceller 10, the background noise estimate may be updated even when synthesized noise is supplied by Tx mute 42, which is undesirable. Further details of vocoder encoder 44 will be provided later herein.

In the receiving direction, again referring to FIG. 2, data is accepted from transceiver 14 and processed by vocoder decoder 46. In the exemplary embodiment, vocoder decoder 46 accepts variable-length data packets at data rates ranging from 1200 to 9600 bps or from 1200 to 13000 bps and produces 64 kbps PCM samples according to aforementioned U.S. Pat. No. 5,414,796 and is shown as z'(n). These PCM samples are then routed through echo canceller 10 to A/D converter 8. Z'(n) is also used by echo canceller 10 as a reference signal to cancel the echo in the Tx direction. The output of echo canceller 10 in the Rx direction is shown as z(n).

Figure 3:
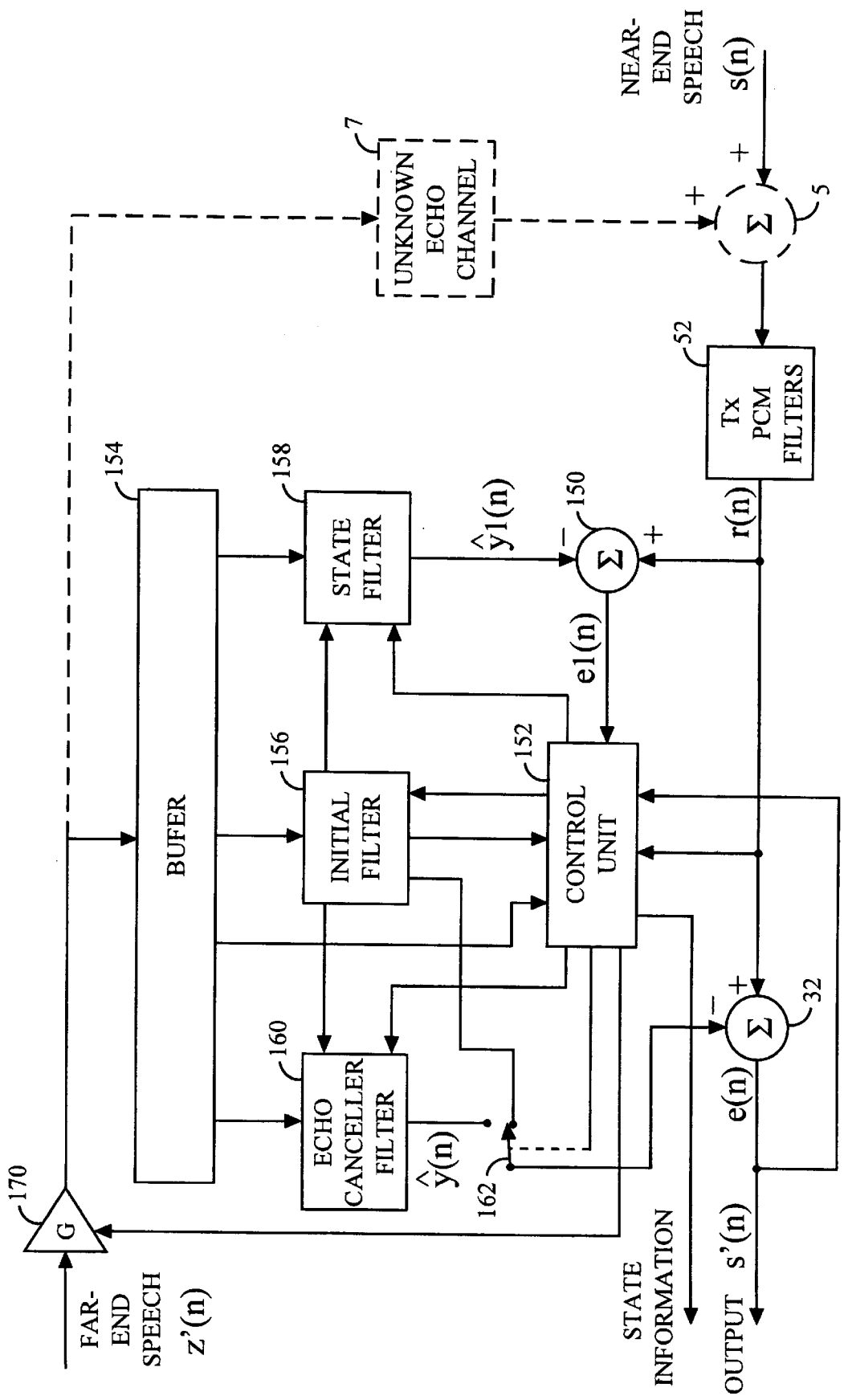
FIG. 3 is a functional block diagram of an echo canceller.

To better understand the present invention, a working knowledge of the various functional blocks is needed. FIG. 3 is a detailed block diagram of echo canceller 10. An example of echo canceller 10 is disclosed in aforementioned U.S. Pat. No. 5,307,405. It should be understood that in the exemplary embodiment, echo canceller 10 is in essence a state machine that has defined functions for each of the five different talk states described above.

In FIG. 3, as was for FIG. 2, the speech signal from the mobile station is labeled as the near-end speech s(n), while the far-end speech signal from Rx PCM filters 50 is labeled as z'(n). Z'(n) is amplified by variable gain stage 170 and coupled to s(n) at summer 5, modeled as passing through unknown echo channel 7. To remove low-frequency background noise, the sum of the echo signal y(n) and the near-end speech signal s(n) is high-pass filtered by Tx PCM filters 52 to produce signal r(n). Signal r(n) is provided as one input to each of summers 32 and 150, and control unit 152.

The input far-end speech z'(n) is fed to variable gain stage 170 and then stored in buffer 154 for input to a set of transversal adaptive filters (initial filter 156, state filter 158 and echo canceller filter 160), and control unit 152.

During the period of normal operation of echo canceller 10, signal $\hat{y}_1(n)$ is output from state filter 158 to one input of summer 150 where it is subtracted from signal r(n). The resultant output from summer 150 is the signal $e_1(n)$ which is input to control unit 152. The output of echo canceller filter 160, the echo replica signal y(n), is provided through filter switch 162 to one input of summer 32 where it is subtracted from the signal r(n). The resultant echo residual signal e(n) output from summer 32 is fed back as an input to control unit 152. Echo residual signal e(n) as output from summer 32 may be provided directly as the output of the echo canceller 10, shown as s'(n), or through additional processing elements, not shown.

To prevent large background noise levels from interfering with state determination, echo canceller 10 performs a differential energy algorithm on signals z'(n) and e(n). This algorithm continually monitors the background noise level and compares it with the signal energy to determine if the speaker is talking. Three thresholds, $T_1(B_i)$, $T_2(B_i)$, and $T_3(B_i)$, are first calculated which are functions of the background noise level $B_i$. If the signal energy of the signal x(n) exceeds all three thresholds, the speaker is determined to be talking. If the signal energy exceeds T1 and T2 but not T3, the speaker is determined to be probably uttering an unvoiced sound, such as the "sp" sound in the word "speed." If the signal energy is smaller than all three thresholds, the speaker is determined to be not talking.

As illustrated in FIG. 3, two independently-adapting filters, filters 158 and 160, track the unknown echo channel. While filter 160 performs the actual echo cancellation, filter 158 is used by the control unit 152 to determine which of several states echo canceller 10 should be operating in. This state information is provided to various functional blocks within vocoder 12, including tone detector 34, noise suppressor/adaptive equalizer 38, Tx mute 42, and vocoder encoder 44.

Figure 4:
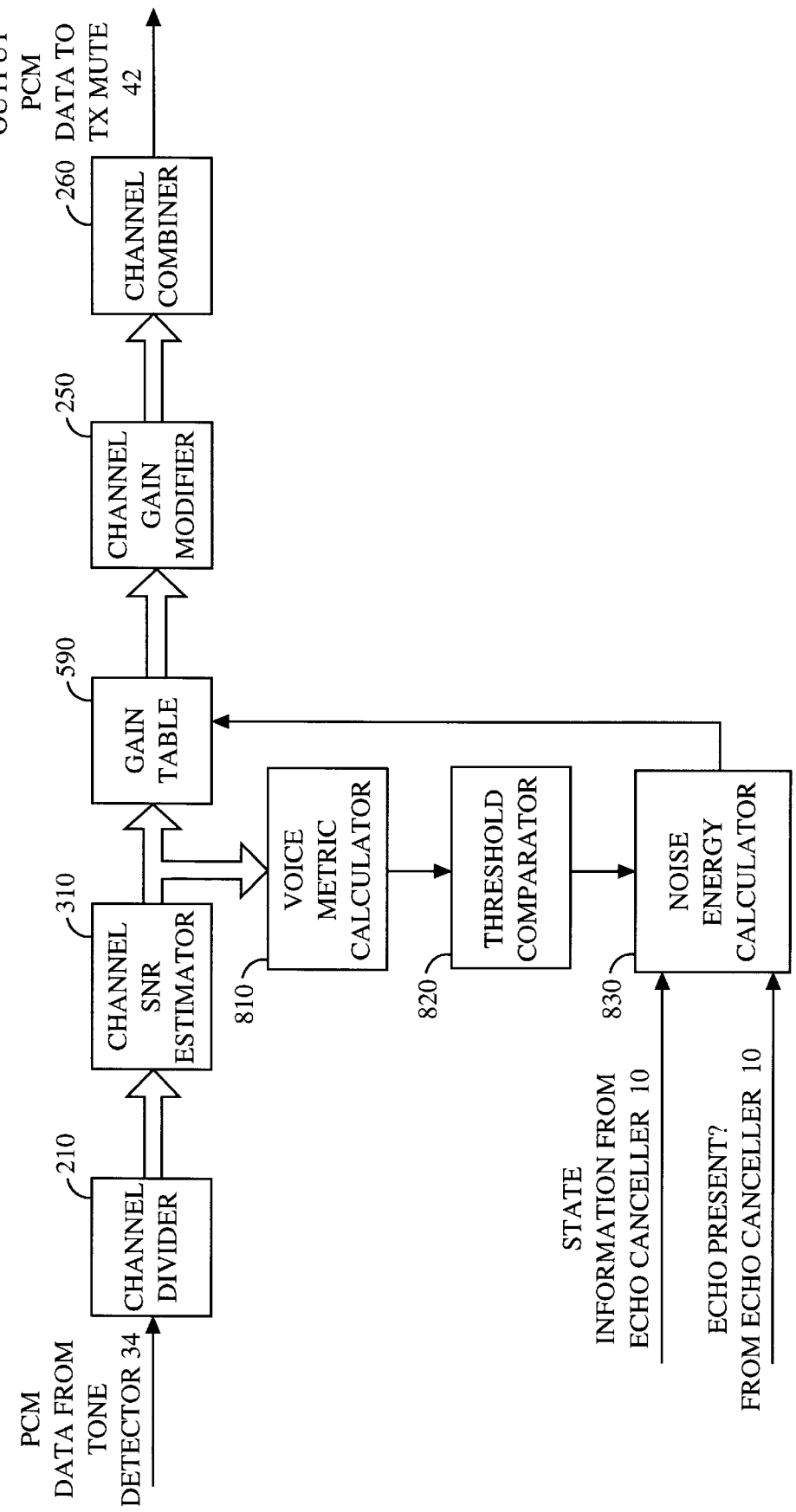
FIG. 4 is a functional block diagram of a noise suppressor.

FIG. 4 is a functional block diagram of noise suppressor 38. An example of noise suppressor 38 is disclosed in aforementioned U.S. Pat. No. 4,811,404. It should be understood that other implementations of noise suppressor 38 may be used other than the one disclosed in U.S. Pat. No. 4,811,404. The noise suppression system includes a mechanism 210 for separating the input signal into a plurality of pre-processed signals representative of selected frequency channels; a mechanism 310 for generating an estimate of the signal-to-noise ratio (SNR) in each individual channel; a mechanism 830 for calculating the noise energy in each frequency channel; a mechanism 590 for producing a gain value for each individual channel by automatically selecting one of a plurality of gain values from a particular gain table in response to the channel SNR estimates; a mechanism 250 for modifying the gain of each of the plurality of pre-processed signals in response to the selected gain values to provide a plurality of post-processed noise-suppressed output signals; and a mechanism 260 for combining the post-processed signals back into time domain PCM data. Voice metric calculator 810 is used to perform the speech/noise decision making process. First, the raw SNR estimates from channel SNR estimator 310 are used to index a voice metric table to obtain voice metric values for each channel. A voice metric is a measurement of the overall voice-like characteristics of the channel energy. The individual channel voice metric values are summed to create a first multi-channel energy parameter, and then compared to a background noise update threshold in threshold comparator 820. If the voice metric sum does not exceed the threshold, the input frame is deemed to be noise, and a background noise update is performed by enabling noise energy calculator 830 to re-calculate the noise energy in each channel. The estimated noise energy is used by gain table 590 to select the appropriate gain for each channel. If the voice metric sum exceeds the update threshold, that frame is deemed to be a voice frame, and noise energy calculator 830 is disabled from updating the noise energy estimate. The present invention provides an additional enable signal from echo canceller 10 that disables noise energy calculator 830 when echo canceller 10 determines that only far-end speech is occurring. This enable signal takes precedence over the enable signal from threshold comparator 820; that is, if noise energy calculator 830 is disabled by the signal from echo canceller 10, it will remain disabled even when provided an enabling signal from threshold comparator 820. Using the state information from echo canceller 10 in this way prevents the background noise estimate from being updated erroneously.

In a second embodiment, echo canceller 10 provides an enable signal to energy calculator 830 that enables background noise estimates when the talk state is determined to be both speakers silent. Without the enable signal from echo canceller 10, no background noise update will occur.

In a third embodiment, a second signal from the echo canceller is provided to the noise suppressor indicating whether any echo is in fact present at the input to the echo canceller. As shown in FIG. 4, the second signal is labeled as "echo preset?" and will allow background noise estimates to be performed if no echo is present at the input to the echo canceller, even though the state information signal would otherwise disable the update. This embodiment is necessary if it is desirable to update the background noise estimate during the far-end only talk state when the far-end speech introduces no echo onto the transmission signal.

In the base station, an adaptive filter is used in place of noise suppressor 38. The purpose of the adaptive filter is to alter the near-end speech to compensate for frequency degradation in the transmission from near-end to far-end speaker. The adaptive filter coefficients are updated during periods of near-end only speech. The state information from echo canceller 10 can be used to enable this update when it detects near-end only speech.

Figure 5:
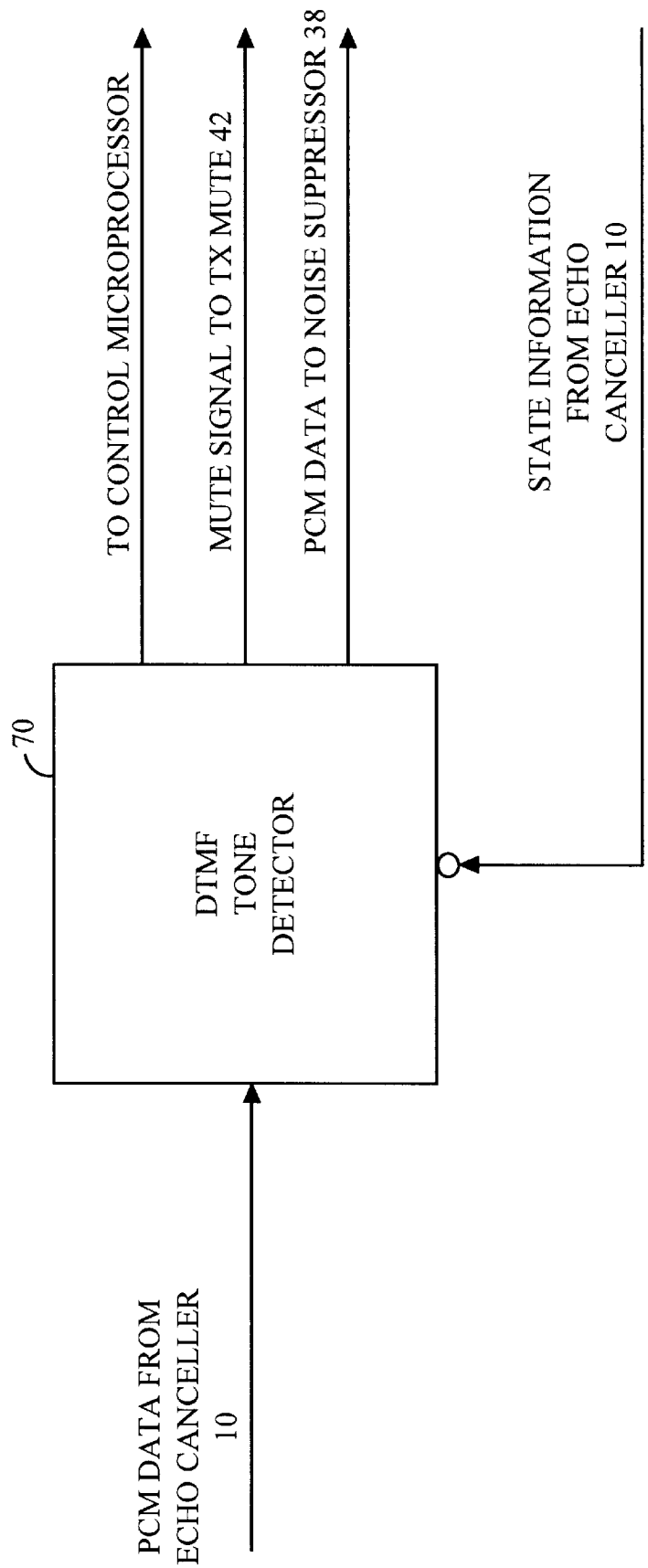
FIG. 5 is a functional block diagram of a tone detector.

The state determination information provided by echo canceller 10 is also used to control tone detector 34. As shown in FIG. 5, tone detector 34 is comprised of one functional block, DTMF tone detector 70. In the exemplary embodiment, PCM encoded data is received by DTMF tone detector 70 at 64 kbps where it is operated on every 105 frames of data. DTMF tone detector 70 uses the Goertzel algorithm with frequency and offset tests specified in AT&T application note entitled "Dual-Tone Multifrequency Receiver Using the WE DSP16 Digital Signal Processor," to determine whether or not DTMF tones are present. The Goertzel algorithm and the AT&T application note are both well-known to those skilled in the art. If DTMF tones are detected, a signal is sent by DTMF tone detector 72 to Tx mute 42 which instructs Tx mute 42 to replace the DTMF tones with synthesized noise. The PCM data is then sent unchanged to noise suppressor 38 even though they are later muted because the background noise estimate can still be updated by noise suppressor 38 during pauses between DTMF tones.

State information from echo canceller 10 is used to disable DTMF tone detector 70 if echo canceller 10 determines that only far-end speech is occurring or if both speakers are silent. This results in saved processing power. When DTMF tone detector 70 is disabled, PCM data from echo canceller 10 is unaltered and provided to noise suppressor 38.

In a second embodiment, state information from echo canceller 10 is used to enable tone detector 70 if echo canceller 10 determines that only near-end speech is occurring. For all other talk states, tone detector 70 would be disabled.

Figure 6:
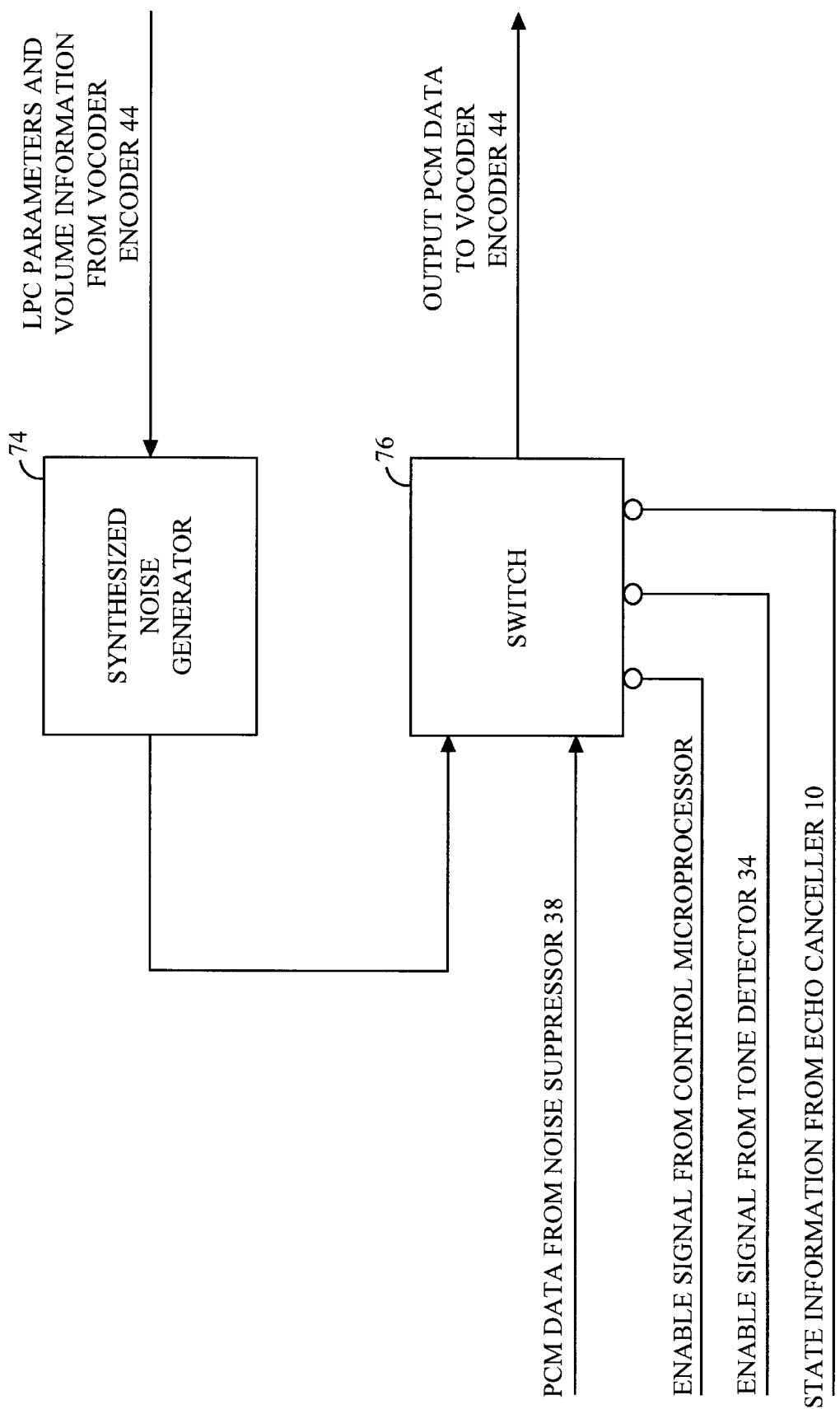
FIG. 6 is a functional block diagram of a transmission mute processor.

The state determination signal from echo canceller 10 is also used to control Tx mute 42. As shown in FIG. 6, PCM data is received by switch 76. If echo canceller 10 detects far-end speech only, a signal is sent to switch 76 which replaces PCM data with synthesized noise from synthesized noise generator 74. Synthesized noise generator 74 uses LPC parameters and volume information from vocoder encoder 44 to match the spectral characteristics of the actual background noise. A discussion of LPC parameters and volume control information is provided later herein. If no muting occurs, the Tx mute function is bypassed, allowing PCM data to be sent to vocoder encoder 44 unchanged.

Figure 7:
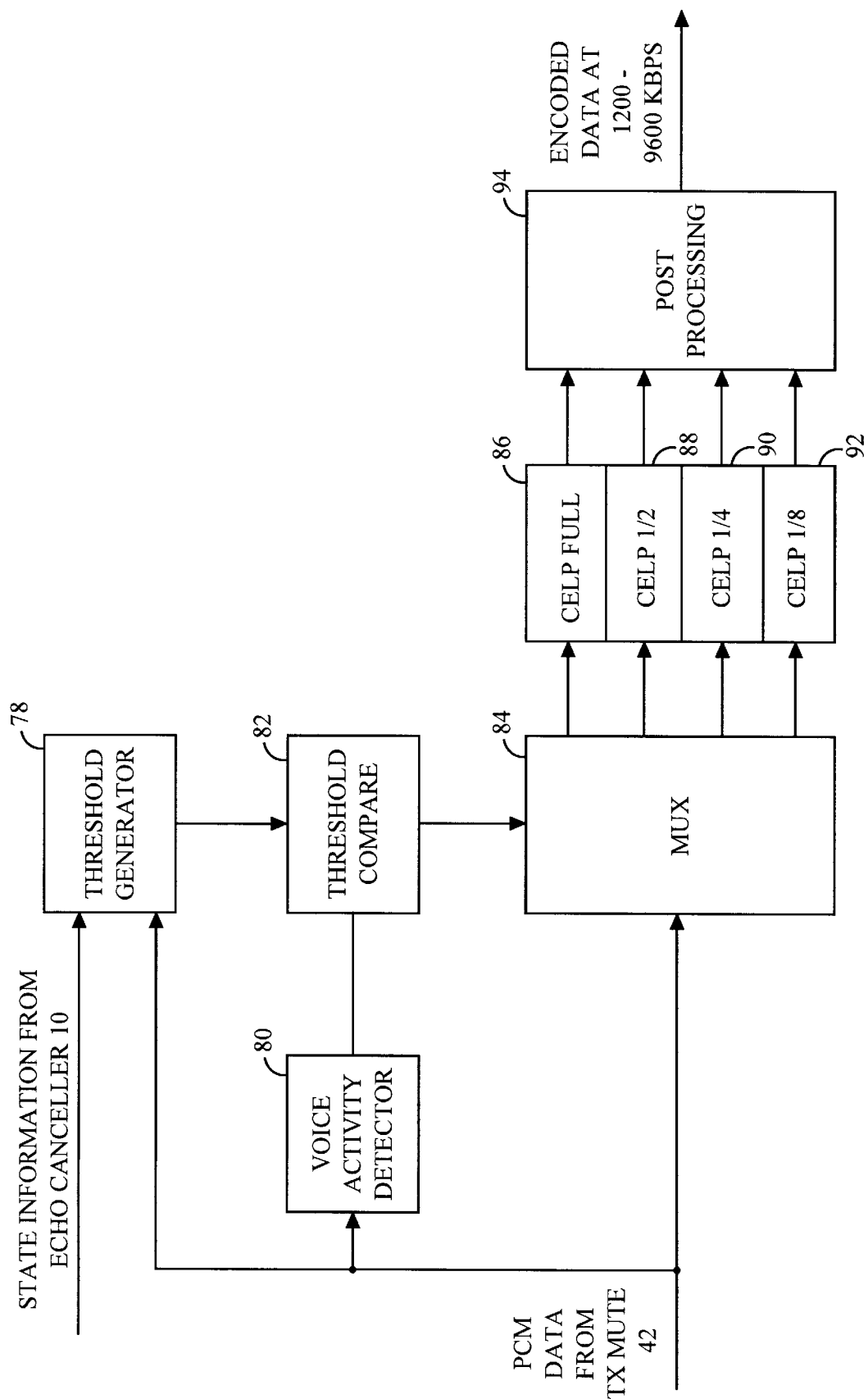
FIG. 7 is a functional block diagram of a vocoder encoder.

The state determination function of echo canceller 10 is also used to control vocoder encoder 44. A functional block diagram of vocoder encoder 44 is shown in FIG. 7. PCM data from Tx mute 42 is provided to voice activity detector 80 and threshold generator 78. Voice activity detector 80 computes the amount of voice activity of the PCM data signal. When the near-end speaker is talking, the voice activity is relatively high. During periods of near-end silence or short pauses between words, the voice activity is relatively low. Threshold generator 78 computes three threshold levels based on the background noise level of the noise suppressed PCM data. The threshold levels are updated whenever the voice activity detector determines a minimal level of speaker activity. However, if the state determination from echo canceller 10 indicates that the talk state is far-end speech only, a state determination signal from echo canceller 10 is provided to threshold generator 78 which disables the background noise update. It is necessary to prevent a background noise update in that situation because when the near-end speaker is silent, synthesized noise replaces the actual data signal in Tx mute 42, as discussed above. It is not desirable to update the background noise estimate signal based on synthesized noise.

In a second embodiment, echo canceller 10 provides an enable signal which enables threshold generator 78 to perform background noise estimates when the talk state is determined to be both speakers silent. In this embodiment, no background noise updates will be performed unless the enable signal is provided by echo canceller 10.

The three computed thresholds discussed above are sent to threshold comparator 82 where they form the basis for the rate encoding decision. The voice activity level is compared to these thresholds on a frame-by-frame basis. In the exemplary embodiment, each frame contains 160 samples, or 20 msec of data. If the voice activity energy exceeds the highest threshold during any frame of PCM data, the near-end speaker is determined to be speaking, and that frame is multiplexed through mux 84 and encoded at full rate using CELP 86. If the voice activity energy during any frame is less than the lowest threshold, that frame is multiplexed through mux 84 and encoded at one-eighth rate using CELP 92. If the voice activity energy during any frame falls between the highest threshold and the lowest threshold, that frame is encoded at a rate of either one-half or one-fourth using CELP 86 and CELP 88, respectively. The output of each CELP processing blocks 86 through 92 are provided to post processing element 94, where they are combined to produce a varying data rate signal between, in the exemplary embodiment, 1.2 kbps and 9.6 kbps. The output of post processing element 94 is sent to the control microprocessor (not shown).

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. An apparatus for speech processing in a digital telephone system, comprising:

an echo canceller for receiving a digitized speech-plus-echo signal, for receiving a far-end speech signal, and for providing an echo-suppressed output signal, said echo canceller comprising;

state determination means for determining which talk states two speakers are engaged in, said state determination means providing a state information signal indicative of said talk states; and a tone detector responsive to said state information signal.

2. The apparatus of claim 1, wherein said tone detector comprises:

input means for receiving digitized speech samples and for receiving said state information signal;

output means for providing said digitized speech samples and for providing a signal indicative of DTMF tone selection and duration;

tone detection means for detecting DTMF tones; and controller means for disabling said tone detection means when said state information signal indicates a far-end speech only state.

3. The apparatus of claim 1, wherein said tone detector comprises:

input means for receiving digitized speech samples and for receiving said state information signal;

output means for providing said digitized speech samples and for providing a signal indicative of DTMF tone selection and duration;

tone detection means for detecting DTMF tones; and controller means for enabling said tone detection means when said state information signal indicates a near-end speech only state.

4. In a speech processing apparatus comprising an echo canceller and a digital processing element, a method for controlling the operation of said digital processing element using state information from said echo canceller, the method comprising the steps of:

generating a state information signal by said echo canceller indicative of a plurality of talk states; and controlling a tone detector function within said digital processing element using said state information signal.

5. The method of claim 4 wherein the controlling step is further comprised the steps of:

disabling said tone detector function within said digital processing element when said state information signal indicates far-end speech only.

6. The method of claim 4 wherein the controlling step is further comprised the steps of:

enabling said tone detector function within said digital processing element when said state information signal indicates near-end speech only.

7. An apparatus for speech processing in a digital telephone system, comprising:

an echo canceller for receiving a digitized speech-plus-echo signal, for receiving a far-end speech signal, and for providing an echo-suppressed output signal, said echo canceller comprising;

state determination means for determining which talk states two speakers are engaged in, said state determination means providing a state information signal indicative of said talk states; and a noise suppressor, separate from said echo canceller, responsive to said state information signal.

8. The apparatus of claim 7, wherein said noise suppressor comprises:

input means for receiving digitized speech samples and for receiving said state information signal;

output means for providing a noise-suppressed digitized speech signal;

background noise estimation means for generating an estimated background noise signal used to suppress background noise; and controller means for disabling said background noise estimation means when said state information signal indicates far-end only speech.

9. The apparatus of claim 7, wherein said noise suppressor comprises:

input means for receiving digitized speech samples and for receiving said state information signal;

output means for providing a noise-suppressed digitized speech signal;

background noise estimation means for generating an estimated background noise signal used to suppress background noise; and controller means for enabling said background noise estimation means when said state information signal indicates both speakers silent.

10. The apparatus of claim 7, wherein said speech processing means is a noise suppressor, comprising of:

input means for receiving digitized speech samples, for receiving said state information signal, and for receiving said signal indicative of whether or not echo is present at said input to said echo canceller;

output means for providing a noise-suppressed digitized speech signal;

background noise estimation means for generating an estimated background noise signal used to suppress background noise; and controller means for enabling said background noise estimation means when said state information signal indicates far-end only speech and said echo detection means indicates no echo present.

11. An apparatus for speech processing in a digital telephone system, comprising:

an echo canceller for receiving a digitized speech-plus-echo signal, for receiving a far-end speech signal, and for providing an echo-suppressed output signal, said echo canceller comprising;

state determination means for determining which talk states two speakers are engaged in, said state determination means providing a state information signal indicative of said talk states; and a transmission muting means, separate from said echo canceller, responsive to said state information signal.

12. The apparatus of claim 11 wherein said transmission muting means comprises:

input means for receiving digitized speech samples and for receiving said state information signal;

output means for providing either said digitized speech samples or a synthesized noise signal;

noise generation means for generating said synthesized noise signal; and controller means for replacing said digitized speech samples with said synthesized noise when said state information signal indicates far-end only speech.

13. An apparatus for speech processing in a digital telephone system, comprising:

an echo canceller for receiving a digitized speech-plus-echo signal, for receiving a far-end speech signal, and for providing an echo-suppressed output signal, said echo canceller comprising;

state determination means for determining which talk states two speakers are engaged in, said state determination means providing a state information signal indicative of said talk states; and a vocoder encoder, separate from said echo canceller, responsive to said state information signal.

14. The apparatus of claim 13, wherein said vocoder encoder comprises:

input means for receiving digitized speech samples and for receiving said state information signal;

output means for providing an encoded digital speech packet at a reduced data rate;

background noise estimation means for generating threshold information used to determine which rate to encode said digitized speech samples; and controller means for disabling said background noise estimation means when said state information signal indicates far-end speech only.

15. The apparatus of claim 13, wherein said vocoder encoder comprises:

input means for receiving digitized speech samples and for receiving said state information signal;

output means for providing an encoded digital speech packet at a reduced data rate;

background noise estimation means for generating threshold information used to determine which rate to encode said digitized speech samples; and controller means for enabling said background noise estimation means when said state information signal indicates both speakers silent.

16. An apparatus for speech processing in a digital telephone system, comprising:

an echo canceller for receiving a digitized speech-plus-echo signal, for receiving a far-end speech signal, and for providing an echo-suppressed output signal, said echo canceller comprising;

state determination means for determining which talk states two speakers are engaged in, said state determination means providing a state information signal indicative of said talk states; and an adaptive equalizer, separate from said echo canceller, responsive to said state information signal.

17. The apparatus of claim 16, wherein said adaptive equalizer comprises:

input means for receiving digitized speech samples and for receiving said state information signal;

output means for providing a frequency compensated digitized speech signal;

frequency estimation means for estimating the spectral content of said digitized speech samples; and controller means for enabling said frequency estimation means when said state information signal indicates far-end only speech.

18. In a speech processing apparatus comprising an echo canceller and a digital processing element, a method for controlling the operation of said digital processing element using state information from said echo canceller, the method comprising the steps of:

generating a state information signal by said echo canceller indicative of a plurality of talk states; and controlling a noise suppressor function, separate from said echo canceller, within said digital processing element using said state information signal.

19. The method of claim 18 wherein the controlling step is further comprised the steps of:

disabling a background noise estimation calculation performed by said noise suppression function within said digital processing element when said state information signal indicates far-end speech only.

20. The method of claim 18 wherein the controlling step is further comprised the steps of:

enabling a background noise estimation calculation performed by noise suppression function within said digital processing element when said state information signal indicates both speakers silent.

21. The method of claim 18, wherein the controlling step is further comprised of:

disabling a background noise estimation calculation performed by said noise suppression function within said digital processing element when both said state information signal indicates far-end speech only and said echo present signal indicates echo present at input to said echo canceller; and enabling said background noise estimation calculation when both said state information signal indicates far-end speech only and said echo present signal indicates no echo present at input to said echo canceller.

22. In a speech processing apparatus comprising an echo canceller and a digital processing element, a method for controlling the operation of said digital processing element using state information from said echo canceller, the method comprising the steps of:

generating a state information signal by said echo canceller indicative of a plurality of talk states; and controlling a transmission muting function, separate from said echo canceller, within said digital processing element using said state information signal.

23. The method of claim 22 wherein the controlling step is further comprised the steps of:

enabling said transmission muting function which replaces digitized speech with synthesized noise when said state information signal indicates far-end speech only and disabling said transmission muting function for all other talk states.

24. In a speech processing apparatus comprising an echo canceller and a digital processing element, a method for controlling the operation of said digital processing element using state information from said echo canceller, the method comprising the steps of:

generating a state information signal by said echo canceller indicative of a plurality of talk states; and controlling a vocoder encoder function, separate from said echo canceller, within said digital processing element using said state information signal.

25. The method of claim 24 wherein the controlling step is further comprised the steps of:

disabling a background noise estimation calculation performed by said vocoder encoder function within said digital processing element when said state information indicates far-end speech only.

26. The method of claim 24 wherein the controlling step is further comprised the steps of:

enabling a background noise estimation calculation performed by said vocoder encoder function within said digital processing element when said state information signal indicates both speakers silent.

27. In a speech processing apparatus comprising an echo canceller and a digital processing element, a method for controlling the operation of said digital processing element using state information from said echo canceller, the method comprising the steps of:

generating a state information signal by said echo canceller indicative of a plurality of talk states; and controlling an adaptive equalizer function, separate from said echo canceller, within said digital processing element using said state information signal.

28. The method of claim 27 wherein the controlling step is further comprised the steps of:

enabling a frequency response update performed by said adaptive equalizer function within said digital processing element when said state information signal indicates near-end speech only.

* * * * *